United States Patent
Aneja et al.

(10) Patent No.: US 10,216,550 B2
(45) Date of Patent: Feb. 26, 2019

(54) TECHNOLOGIES FOR FAST BOOT WITH ADAPTIVE MEMORY PRE-TRAINING

(71) Applicant: Intel Corporation, Santa Clara, CA (US)

(72) Inventors: Amit Aneja, Chandler, AZ (US); Jorge Serratos Hernandez, Zapopan (MX); Bruno Achauer, Zaberfeld (DE)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 15/283,332

(22) Filed: Oct. 1, 2016

(65) Prior Publication Data

US 2018/0095806 A1 Apr. 5, 2018

(51) Int. Cl.
| | | |
|---|---|---|
| *G06F 13/16* | (2006.01) | |
| *G06F 9/54* | (2006.01) | |
| *G06F 9/4401* | (2018.01) | |
| *B60W 50/06* | (2006.01) | |
| *B60W 50/00* | (2006.01) | |
| *G06F 11/00* | (2006.01) | |

(52) U.S. Cl.
CPC ......... *G06F 9/542* (2013.01); *B60W 50/0098* (2013.01); *B60W 50/06* (2013.01); *G06F 9/4403* (2013.01); *G06F 11/00* (2013.01); *G06F 13/1689* (2013.01)

(58) Field of Classification Search
CPC ........................... G06F 9/4403; G06F 13/1689
See application file for complete search history.

(56) References Cited

U.S. PATENT DOCUMENTS

| | | | | |
|---|---|---|---|---|
| 2012/0191964 A1* | 7/2012 | Lee | ...................... | G06F 11/2284 713/2 |
| 2014/0032826 A1* | 1/2014 | Lee | .......................... | G06F 12/00 711/104 |
| 2015/0212955 A1* | 7/2015 | Easwaran | ............... | G06F 13/24 710/317 |

* cited by examiner

*Primary Examiner* — Albert Wang
(74) *Attorney, Agent, or Firm* — Barnes & Thornburg LLP (57) ABSTRACT

Technologies for an advanced driver assist system (ADAS) with adaptive memory pre-training include a computing device and a safety microcontroller in communication with a serial link and a general-purpose I/O (GPIO) link. Out of reset, the computing device determines whether a full memory training signal is raised via the GPIO link. If not raised, the computing device executes a fast boot path to initialize a memory controller with a pre-trained memory parameter data set and performs margin tests to check the validity of the pre-trained memory parameter data set. If the full memory training signal is raised, the computing device executes a slow boot path to generate the pre-trained memory parameter data set. The safety microcontroller may receive a message requesting full memory training via the serial link and, in response, hold the computing device in reset and raise the full memory training signal. Other embodiments are described and claimed.

25 Claims, 5 Drawing Sheets

TECHNOLOGIES FOR FAST BOOT WITH ADAPTIVE MEMORY PRE-TRAINING

BACKGROUND

Typical computing platforms require certain parameters of the memory controller to be tuned in order to successfully access DRAM. For example, certain system-on-a-chip processors manufactured by Intel® Corporation may re-train memory parameters such as the RD, WR, and CMD signals during each boot process. This memory training may occur early in the boot process and may require several seconds to complete.

Many vehicles are including additional computer systems to provide advanced driver assist functionality such as collision warning, lane departure warning, pedestrian detection, or other functionality.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
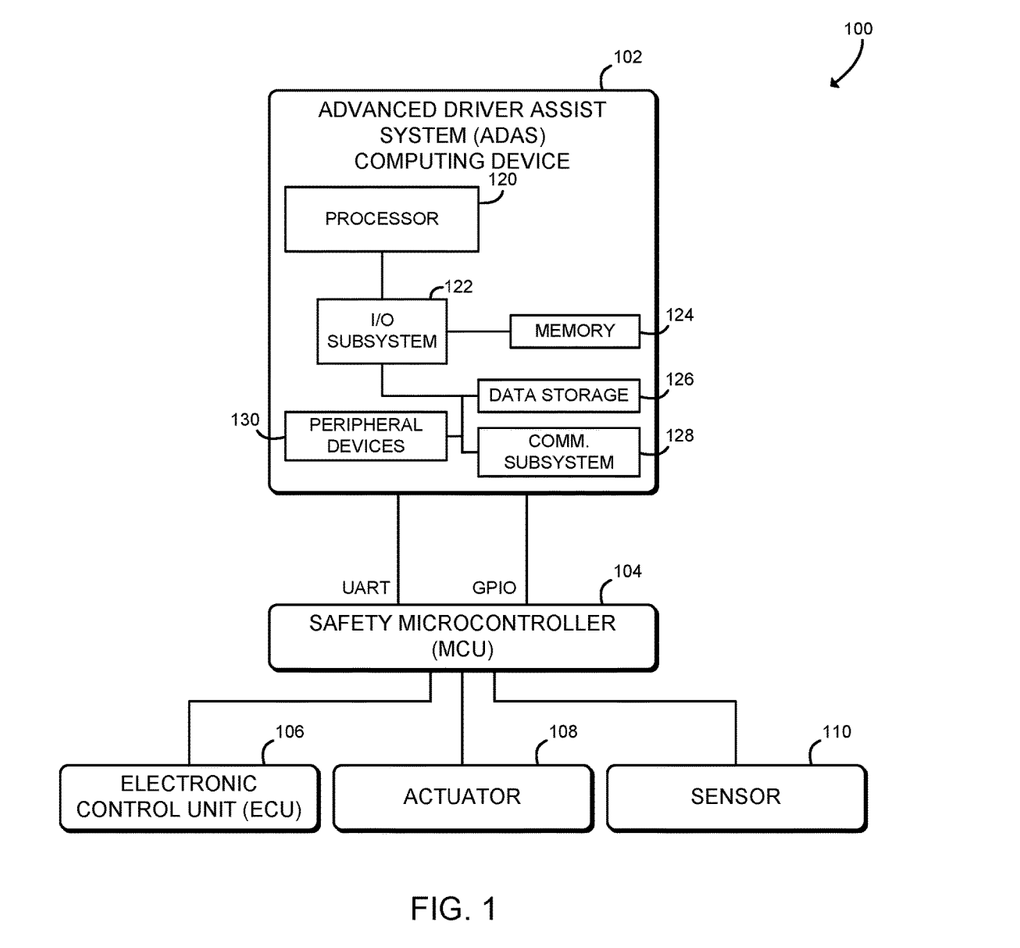
FIG. 1 is a simplified block diagram of at least one embodiment of an advanced driver assist system for fast boot with adaptive memory pre-training.

Referring now to FIG. 1, in an illustrative embodiment, an advanced driver assist system (ADAS) 100 includes an ADAS computing device 102 coupled to a safety microcontroller 104. The ADAS computing device 102 provides advanced driver assist features such as collision warning, lane departure warning, pedestrian detection, adaptive cruise control, autonomous driving, or other advanced features. The safety microcontroller 104 manages power and reset for the ADAS computing device 102 and manages communication between the ADAS computing device 102 and various electronic control units (ECUs) 106, actuators 108, and/or sensors 110 included in the ADAS 100. The ADAS 100 may be installed in an automobile or other vehicle (not shown). In use, as described further below, the ADAS computing device 102 may execute a fast boot path in which a memory controller is initialized using pre-trained memory parameter data or a slow boot path in which full memory training is performed to generate the pre-trained memory parameter data. The safety microcontroller 104 may raise a signal to the ADAS computing device 102 that causes the ADAS computing device 102 to execute the slow boot path and perform the full memory training. Full memory training may be performed, for example, in response to failing a memory parameter margin test or in response to a training policy that may be provided by a vehicle manufacturer. The ADAS computing device 102 may perform the memory parameter margin test during each execution of the fast boot path.

Automotive computing devices provide safety-related functionality and are thus subject to strict boot time and functional safety requirements. Additionally, vehicles present a challenging operating environment for computing devices including extreme temperatures and extended life cycles compared to other computing applications. Thus, the disclosed ADAS 100 may provide fast booting of the ADAS computing device 102 when possible, while also safely performing memory re-training. For example, initializing the memory controller using pre-trained memory data is expected to require about 100 milliseconds, as compared to about 15 seconds required for full memory parameter training. Additionally, the ADAS 100 may adapt to changes in component performance caused by aging, temperature, or other environmental effects over the lifetime of a vehicle. Additionally, although illustrated as an advanced driver assist system in an automotive context, it should be understood that the techniques of the system 100 may be applied to any other system requiring fast, reliable booting with adaptive memory re-training. For example, the system 100 may be applied to industrial, medical, internet-of-things (IoT), or communications data center applications. In some embodiments, the functionality of the safety microcontroller 104 may be provided by a different embedded device, such as an embedded controller (EC), baseband management controller (BMC), or similar device to provide application-specific reliability and system manageability functions.

The ADAS computing device 102 may be embodied as any type of computation or computer device capable of performing the functions described herein, including, without limitation, an embedded computing device, a system-on-a-chip, an electronic control unit (ECU), a computer, an in-vehicle infotainment system, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the ADAS computing device 102 illustratively includes a processor 120, an input/output subsystem 122, a memory 124, a data storage device 126, and a communication subsystem 128. Of course, the ADAS computing device 102 may include other or additional components, such as those commonly found in an ECU (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the ADAS computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the ADAS computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, serial port links, general-purpose I/O links, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the ADAS computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. For example, the data storage device 126 may include one or more flash memory devices coupled to the I/O subsystem 122 via a serial peripheral interface (SPI) bus. As described further below, the data storage device 126 may be used to store pre-trained memory parameters used during a fast boot path.

The communication subsystem 128 of the ADAS computing device 102 may be embodied as any communication circuit, device, or collection thereof, capable of enabling communications between the ADAS computing device 102, the safety microcontroller 104, and/or other remote devices, directly or over a network. The communication subsystem 128 may be configured to use any one or more communication technology (e.g., wired or wireless communications) and associated protocols (e.g., Ethernet, CAN, Bluetooth®, Wi-Fi®, WiMAX, etc.) to effect such communication.

As shown, the ADAS computing device 102 may also include one or more peripheral devices 130. The peripheral devices 130 may include any number of additional input/output devices, interface devices, sensors, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The safety microcontroller 104 may be embodied as any type of controller or other computation device capable of performing the functions described herein, including, without limitation, a microcontroller, embedded controller, baseband management controller, microprocessor, or other computing device. For example, the safety microcontroller 104 may be embodied as a robust and reliable microcontroller used to allow the ADAS 100 to meet functional safety requirements. As shown, the safety microcontroller 104 is coupled to the ADAS computing device 102 via a serial connection using a universal asynchronous receiver/transmitter (UART) as well as via a general-purpose I/O (GPIO) pin. The safety microcontroller 104 may also be coupled to the ADAS computing device 102 via additional connections, for example to a reset line, or may be otherwise capable of performing reset and power management for the ADAS computing device 102. As shown, the safety microcontroller 104 also provides a communication mechanism to ECUs 106, actuators 108, sensors 110, and other components of the ADAS 100. In some embodiments, the safety microcontroller 104 may also include dedicated volatile or non-volatile memory as well as one or more firmware devices.

Figure 2:
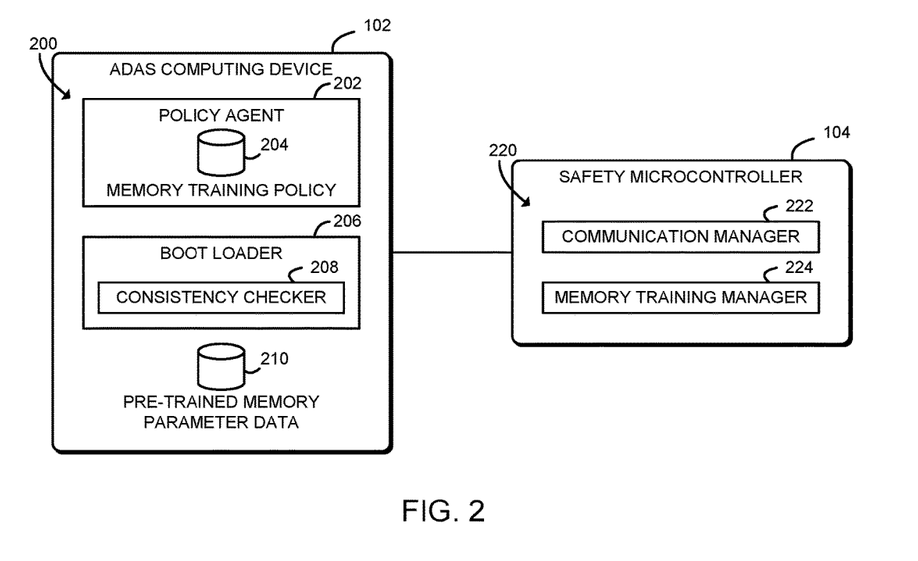
FIG. 2 is a simplified block diagram of at least one embodiment of various environments that may be established by the system of FIG. 1.

Referring now to FIG. 2, in an illustrative embodiment, the ADAS computing device 102 establishes an environment 200 during operation. The illustrative environment 200 includes a policy agent 202 and a boot loader 206. The various components of the environment 200 may be embodied as hardware, firmware, software, or a combination thereof. As such, in some embodiments, one or more of the components of the environment 200 may be embodied as circuitry or collection of electrical devices (e.g., policy agent circuitry 202 and/or boot loader circuitry 206). It should be appreciated that, in such embodiments, one or more of the policy agent circuitry 202 and/or the boot loader circuitry 206 may form a portion of the processor 120, the I/O subsystem 122, and/or other components of the ADAS computing device 102. Additionally, in some embodiments, one or more of the illustrative components may form a portion of another component and/or one or more of the illustrative components may be independent of one another.

As shown, the boot loader 206 may include one or more sub-components, including a consistency checker 208. The consistency checker 208 is configured to determine whether a pre-trained memory parameter data set 210 is inconsistent in response to a reset of the processor 120. The pre-trained memory parameter data 210 is stored by a non-volatile storage device 126 of the ADAS computing device 102. The consistency checker 208 is further configured to send a message that requests full memory training to the safety microcontroller 104 via a serial link in response to determining that the pre-trained memory parameter data set 210 is inconsistent.

The boot loader 206 is configured to determine whether a full memory training signal is raised via a general-purpose I/O link with the safety microcontroller 104 in response to determining that the pre-trained memory parameter data set 210 is consistent. The boot loader 206 is configured to execute a fast boot path to initialize a memory controller of the ADAS computing device 102 with the pre-trained memory parameter data set 210 in response to determining that the full memory training signal is not raised. The boot loader 206 is configured to execute a slow boot path to generate the pre-trained memory parameter data set 210 in response to determining that the full memory training signal is raised. The boot loader 206 is further configured to boot an operating system of the ADAS computing device 102 in response to executing the fast boot path or the slow boot path.

The policy agent 202 is configured to determine whether a full memory training is required based on a memory training policy 204 of the ADAS computing device 102 in response to booting the operating system. The memory training policy 204 may be embodied as any rule or set of rules that define when full memory training is required such as, for example, a maximum elapsed time between full memory training or whether margin parameter tests fail at warning level. The policy agent 202 is further configured to send, by the operating system, a message that requests a scheduled full memory training to the safety microcontroller 104 via the serial link in response to determining that the full memory training is required.

Still referring to FIG. 2, in the illustrative embodiment, the safety microcontroller 104 establishes an environment 220 during operation. The illustrative environment 220 includes a communication manager 222 and a memory training manager 224. The various components of the environment 220 may be embodied as hardware, firmware, software, or a combination thereof. As such, in some embodiments, one or more of the components of the environment 220 may be embodied as circuitry or collection of electrical devices (e.g., communication manager circuitry 222 and/or memory training manager circuitry 224). It should be appreciated that, in such embodiments, one or more of the communication manager circuitry 222 and/or the memory training manager circuitry 224 may form a portion of the safety microcontroller 104. Additionally, in some embodiments, one or more of the illustrative components may form a portion of another component and/or one or more of the illustrative components may be independent of one another.

The communication manager 222 is configured to send and/or receive messages via the serial link with the processor 120. The communication manager 222 may be configured to receive, for example, a message that requests full memory training from the processor 120, a message that indicates full memory training is complete from the processor 120, and/or a message that requests scheduled full memory training from the processor 120.

The memory training manager 224 is configured to hold the processor 120 in reset in response to receiving a message that requests full memory training, disable a watchdog timer for the processor 120 in response to holding the processor 120 in reset, raise the full memory training signal via the general-purpose I/O link with the processor 120 in response to holding the processor 120 in reset, and reset the processor 120 in response to raising of the full memory training signal. The memory training manager 224 may be further configured to enable the watchdog timer for the processor 120 in response to receiving a message that indicates the full memory training is complete. The memory training manager 224 may be further configured to raise the full memory training signal via the general-purpose I/O link with the processor 120 in response to a reboot of the processor 120 in response to receiving a message that requests scheduled full memory training.

Figure 3:
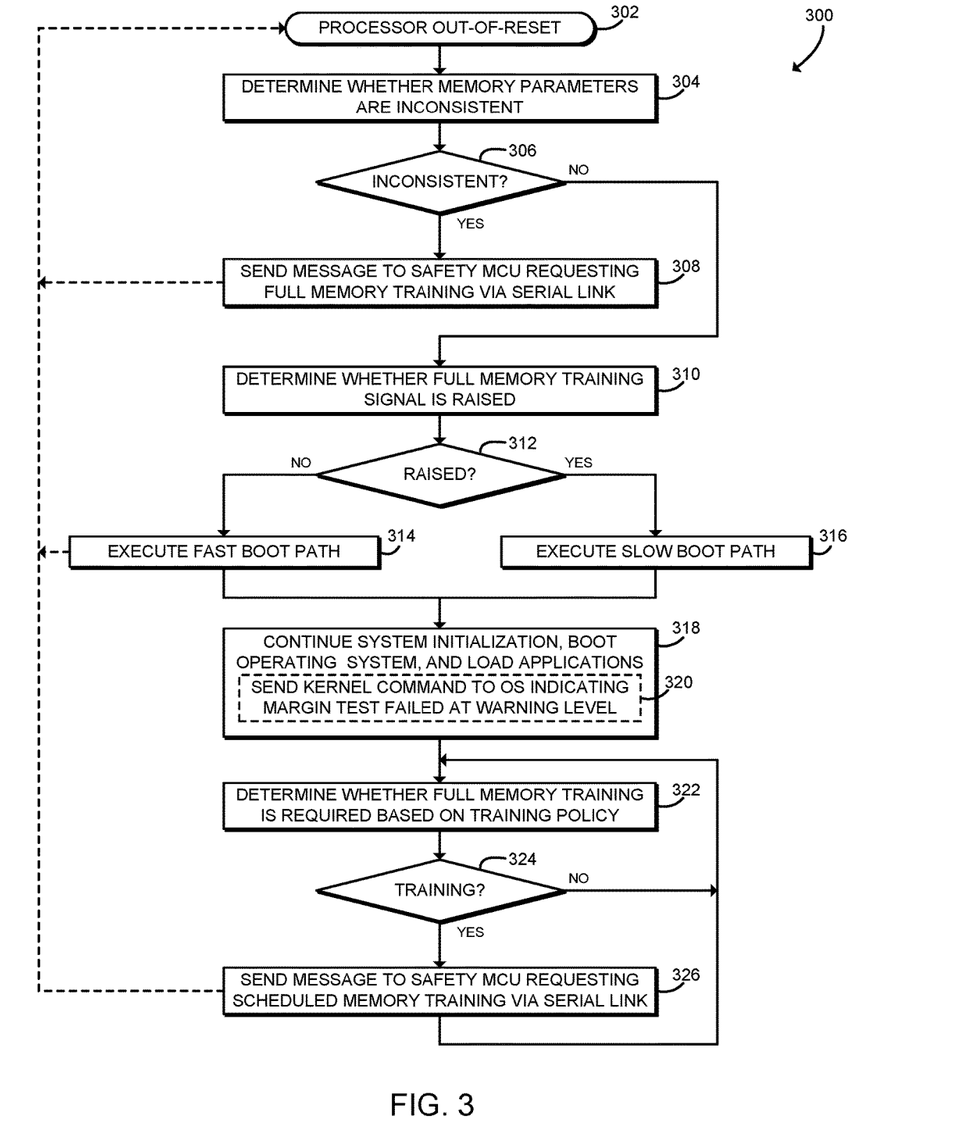
FIG. 3 is a simplified flow diagram of at least one embodiment of a method for fast boot with adaptive memory pre-training that may be executed by an advanced driver assist system (ADAS) computing device of the system of FIGS. 1-2.

Referring now to FIG. 3, in use, the ADAS computing device 102 may execute a method 300 for fast boot with adaptive memory pre-training. It should be appreciated that, in some embodiments, the method 300 may be embodied as various instructions stored on a computer-readable media, which may be executed by the processor 120, the I/O subsystem 122, and/or other components of the ADAS computing device 102 to cause the ADAS computing device 102 to perform the method 300. The computer-readable media may be embodied as any type of media capable of being read by the ADAS computing device 102 including, but not limited to, the memory 124, the data storage device 126, firmware devices, and/or other media. Additionally or alternatively, it should be appreciated that, in some embodiments, the operations of the method 300 may be performed by one or more components of the environment 200 of the ADAS computing device 102 as shown in FIG. 2.

The method 300 begins in block 302, in which the ADAS computing device 102 brings the processor 120 out of reset. The processor 120 may come out of reset during every power cycle of the ADAS computing device 102. Additionally, and as described further below, the safety microcontroller 104 may hold the processor 120 in reset when the ADAS 100 is put into fail-safe state. Once the processor 120 is brought out of reset, for example if the safety microcontroller 104 drives a reset line to the appropriate level, the processor 120 starts executing early boot firmware or other code of the ADAS computing device 102. For example, the processor 120 may start execution from a predefined reset vector. The ADAS computing device 102 may proceed to bring up the boot loader 206 or other early boot code.

In block 304, the ADAS computing device 102 determines whether pre-trained memory parameter data 210 is inconsistent or does not exist. As described further below, the pre-trained memory parameter data 210 may have been generated during a previous full memory training. However, the previous full memory training may have been interrupted, for example by the driver keying off the vehicle or otherwise powering off the ADAS 100. Therefore, the pre-trained memory parameter data 210 may exist in an incomplete, inconsistent, or otherwise corrupted state, or may not exist at all. The ADAS computing device 102 may determine whether the pre-trained memory parameter data 210 based on size, version, time stamp, checksum value, or other attributes of the pre-trained memory parameter data 210. In block 306, the ADAS computing device 102 checks whether the pre-trained memory parameter data 210 is inconsistent or non-existent. If not, the method 300 branches ahead to block 310, described below. If the pre-trained memory parameter data 210 is inconsistent or non-existent, the method 300 advances to block 308.

In block 308, the ADAS computing device 102 sends a message to the safety microcontroller 104 via the serial link requesting a full memory training. The ADAS computing device 102 may use any appropriate message format or communication protocol to transmit the message to the safety microcontroller 104. As described below in connection with FIG. 6, in response to the request for full memory training, the safety microcontroller 104 puts the ADAS 100 into fail-safe state, which drives the processor 120 into reset. The safety microcontroller 104 then brings the processor 120 out of reset, which causes the method 300 to asynchronously restart at block 302. Therefore, after transmitting the message to the safety microcontroller 104, the method 300 is completed.

Referring back to block 306, if the pre-trained memory parameter data 210 is available and not inconsistent, the method 300 branches ahead to block 310, in which the ADAS computing device 102 determines whether a full memory training signal has been raised by the safety microcontroller 104. As described below in connection with FIG. 6, the safety microcontroller 104 raises the full memory training signal when a full memory re-training is required. The ADAS computing device 102 may determine whether the full memory training signal is raised by, for example, reading the value of a GPIO pin (e.g., Full_Mem_Train_GPIO) coupled to the safety microcontroller 104. In block 312, the ADAS computing device 102 checks whether the full memory training signal is raised. For example, the ADAS computing device 102 may determine whether the Full_Mem_Train_GPIO signal has been driven high by the safety microcontroller 104. If the full memory training signal is not raised, the method 300 advances to block 314.

In block 314, the ADAS computing device 102 executes a fast boot path. During execution of the fast boot path, the ADAS computing device 102 initializes the memory controller using the pre-trained memory parameter data 210. For example, a memory reference code (MRC) firmware may load the pre-trained memory parameter data 210 from a non-volatile memory such as an SPI flash device. After loading the pre-trained memory parameter data 210, the ADAS computing device 102 performs one or more fast memory parameter margin checks as described further below in connection with FIG. 4. If those margin checks fail, the safety microcontroller 104 may put the ADAS 100 into the fail-safe state and hold the processor 120 in reset. Thus, in some embodiments, after executing block 314, the method 300 may asynchronously restart at block 302. If the margin tests pass or fail at a warning level, the fast boot path completes successfully. One potential embodiment of a method for executing the fast boot path is described below in connection with FIG. 4. After executing the fast boot path successfully, the method 300 advances to block 318, described below.

Referring back to block 312, if the full memory training signal is raised, the method 300 branches to block 316, in which the ADAS computing device 102 executes a slow boot path. During execution of the slow boot path, the ADAS computing device 102 performs a full memory training and generates the pre-trained memory parameter data 210. The ADAS computing device 102 stores the pre-trained memory parameter data 210 in a non-volatile memory (e.g., the SPI flash device) for future boot cycles. One potential embodiment of a method for executing the slow boot path is described below in connection with FIG. 5. After executing the slow boot path successfully, the method 300 advances to block 318.

In block 318, the ADAS computing device 102 continues system initialization, booting an operating system and loading various applications. For example, the boot loader 206 may pass control of the ADAS computing device 102 to an operating system, and the operating system may load an ADAS application to provide advanced driver aid services to the driver. For example, the ADAS application may receive sensor data from the sensors 110 of the vehicle and perform a driver assist function based on the sensor data (e.g., collision warning, lane departure warning, pedestrian detection, adaptive cruise control, autonomous driving and/or other advanced driver assist function). The operating system may also load additional applications, such as a policy agent 202. In some embodiments, in block 320, the ADAS computing device 102 sends a kernel command from the boot loader to the operating system indicating that a margin test failed at a warning level. The kernel message may allow the operating system or applications such as the policy agent 202 to become aware of margin test warnings that occurred during execution of the boot loader 206.

In block 322, the ADAS computing device 102 determines whether a full memory training is required based on a memory training policy 204. The memory training policy 204 may be embodied as one or more rules indicating conditions that require full memory training. For example, the memory training policy 204 may specify a maximum time that may elapse between full memory trainings. As another example, the memory training policy 204 may specify that memory training is required in response to a margin test failure at the warning level. The memory training policies 204 may be supplied or otherwise configured by a vehicle manufacturer or other integrator of the ADAS 100. Additionally, although illustrated as evaluating the memory training policy 204 after booting an operating system, it should be understood that in some embodiments the memory training policy 204 may be evaluated by firmware such as the boot loader 206. In block 324, the ADAS computing device 102 checks whether training is required. If not, the method 300 loops back to block 322 to continue evaluating the memory training policies 204. If memory training is required, the method 300 advances to block 326.

In block 326, the ADAS computing device 102 sends a message to the safety microcontroller 104 via the serial link requesting scheduled memory training. As described below in connection with FIG. 6, in response to the message requesting scheduled memory training, the safety microcontroller 104 raises the full memory training signal upon the next reboot. After sending the message to the safety microcontroller 104, the method 300 loops back to block 322 to continue evaluating the memory training policies 204. In some embodiments, the safety microcontroller 104 may immediately force a full memory training and thus the method 300 may also asynchronously restart at block 302.

Figure 4:
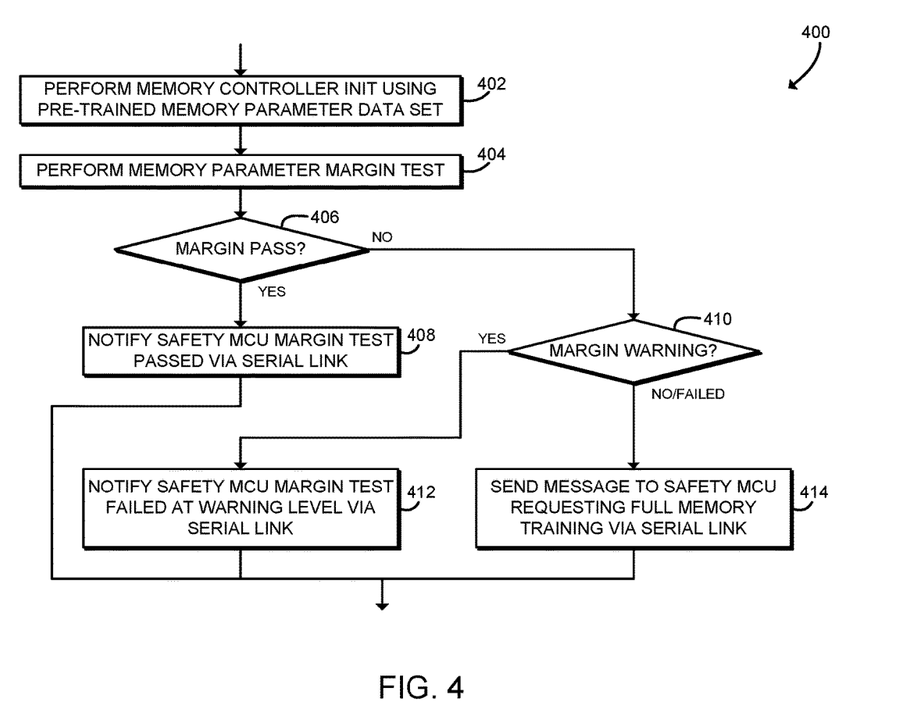
FIG. 4 is a simplified flow diagram of at least one embodiment of a method for a fast boot path that may be executed by the ADAS computing device of the system of FIGS. 1-2.

Referring now to FIG. 4, in use, the ADAS computing device 102 may execute a method 400 for the fast boot path. As described above, the method 400 may be executed, for example, in connection with block 314 of FIG. 3. It should be appreciated that, in some embodiments, the method 400 may be embodied as various instructions stored on a computer-readable media, which may be executed by the processor 120, the I/O subsystem 122, and/or other components of the ADAS computing device 102 to cause the ADAS computing device 102 to perform the method 400. The computer-readable media may be embodied as any type of media capable of being read by the ADAS computing device 102 including, but not limited to, the memory 124, the data storage device 126, firmware devices, and/or other media. Additionally or alternatively, it should be appreciated that, in some embodiments, the operations of the method 400 may be performed by one or more components of the environment 200 of the ADAS computing device 102 as shown in FIG. 2.

The method 400 begins in block 402, in which the ADAS computing device 102 performs memory controller initialization using the pre-trained memory parameter data 210. The ADAS computing device 102 may perform the initialization by, for example, passing control to memory reference code (MRC) firmware. The ADAS computing device 102 may read the pre-trained memory parameter data 210 from a non-volatile memory such as an SPI flash device. The pre-trained memory parameter data 210 may include timing, level, or other parameters for various signals used by the memory controller to communicate with the memory 124, including the RD, WR, and CMD signals. After performing initialization, the ADAS computing device 102 may be capable of safely accessing data in the memory 124, including program code or data.

In block 404, the ADAS computing device 102 performs one or more memory parameter margin tests. The memory parameter margin tests may be performed by the MRC firmware. The memory parameter margin tests are fast tests that may determine whether the current memory parameters are within acceptable margins. For example, the ADAS computing device 102 may run fast CPGC VA tests at certain predetermined margin limits (e.g., a warning level or a critical level) for each of the memory margin parameters (e.g., RXDQS, RXVREF, TXDQS, TXVREF, WRDQ, CMD, etc.). As an illustration, the RXDQS signal may be tested at ±10 from the trained point (i.e., the warning level) and tested at ±5 from the trained point (i.e., the critical level). The critical level may be chosen to identify memory parameters that do not provide functionally safe operation. The warning level may be chosen to identify memory parameters that, while providing functionally safe operation, may indicate performance degradation for example due to age, temperature, or other operating conditions.

In block 406, the ADAS computing device 102 determines whether all of the margin tests passed (i.e., all of the margin tests were below the warning level or otherwise satisfied the appropriate criteria). If not, the method 400 branches to block 410, described below. If the margin tests pass, then the method 400 advances to block 408, in which the ADAS computing device 102 notifies the safety microcontroller 104 that the margin tests passed via the serial link. As described below in connection with FIG. 6, in response to the notification the safety microcontroller 104 allows the ADAS system 100 to execute normally. After notifying the safety microcontroller 104, the method 400 is completed, and the ADAS computing device 102 may continue the boot process.

Referring back to block 406, if any margin test fails, the method 400 branches to block 410, in which the ADAS computing device 102 determines whether the margin tests failed at a warning level. If not (e.g., if any margin test failed at a critical level), the method 400 branches to block 414, described below. If the margin tests fail at a warning level, the method 400 branches to block 412, in which the ADAS computing device 102 notifies the safety microcontroller 104 that the margin tests failed at the warning level. As described below in connection with FIG. 6, in response to the notification, the safety microcontroller 104 allows the ADAS system 100 to execute normally. After notifying the safety microcontroller 104, the method 400 is completed, and the ADAS computing device 102 may continue the boot process. As described above in connection with FIG. 3, depending on the memory training policy 204, after booting the operating system the ADAS computing device 102 may request full memory training in response to the margin tests failing at the warning level.

Referring back to block 410, if the margin tests do not fail at the warning level (i.e., if any margin test fails at the critical level), the method 400 branches to block 414, in which the ADAS computing device 102 sends a message requesting full memory training to the safety microcontroller 104 via the serial link. After transmitting the message to the safety microcontroller 104, the method 400 is completed. As described below in connection with FIG. 6, in response to the message, the safety microcontroller 104 may put the ADAS 100 into the fail-safe state and then cause the ADAS computing device 102 to initiate full memory training.

Figure 5:
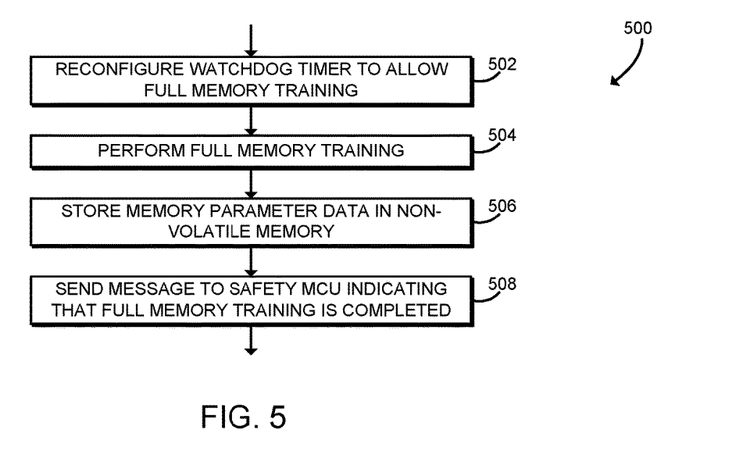
FIG. 5 is a simplified flow diagram of at least one embodiment of a method for a slow boot path that may be executed by the ADAS computing device of the system of FIGS. 1-2.

Referring now to FIG. 5, in use, the ADAS computing device 102 may execute a method 500 for the slow boot path. As described above, the method 500 may be executed, for example, in connection with block 316 of FIG. 3. It should be appreciated that, in some embodiments, the method 500 may be embodied as various instructions stored on a computer-readable media, which may be executed by the processor 120, the I/O subsystem 122, and/or other components of the ADAS computing device 102 to cause the ADAS computing device 102 to perform the method 500. The computer-readable media may be embodied as any type of media capable of being read by the ADAS computing device 102 including, but not limited to, the memory 124, the data storage device 126, firmware devices, and/or other media. Additionally or alternatively, it should be appreciated that, in some embodiments, the operations of the method 500 may be performed by one or more components of the environment 200 of the ADAS computing device 102 as shown in FIG. 2.

The method 500 begins in block 502, in which the ADAS computing device 102 reconfigures a watchdog timer to allow full memory training. The watchdog timer may be included in the I/O subsystem 122 and/or external to the ADAS computing device 102. The ADAS computing device 102 extends the time limit for the watchdog timer to allow enough time for a potentially lengthy full memory training process. For example, in some embodiments the ADAS computing device 102 may extend the time limit to at least twenty seconds. The particular time limit used may depend on the particular system architecture and/or memory implementation of the ADAS computing device 102.

In block 504, the ADAS computing device 102 performs full memory training. The full memory training generates appropriate memory parameters based on the current conditions of the memory 124 and other components of the ADAS computing device 102. Thus, performing the full memory training may allow the ADAS computing device 102 to adapt to changes in performance caused by component degradation due to aging, temperature, and/or other environmental factors. In block 506, the ADAS computing device 102 stores the memory parameters as the pre-trained memory parameter data 210 in non-volatile storage of the ADAS computing device 102. For example, the pre-trained memory parameter data 210 may be stored in a non-volatile memory such as an SPI flash device. After storage, the pre-trained memory parameter data 210 is available for use in future boot cycles.

In block 508, the ADAS computing device 102 sends a message indicating that the full memory training is complete to the safety microcontroller 104 via the serial link. As described below in connection with FIG. 6, in response to the message the safety microcontroller 104 may re-enable the watchdog timer and otherwise allow the ADAS 100 to operate normally. After transmitting the message to the safety microcontroller 104, the method 500 is completed, and the ADAS computing device 102 may continue the boot process.

Figure 6:
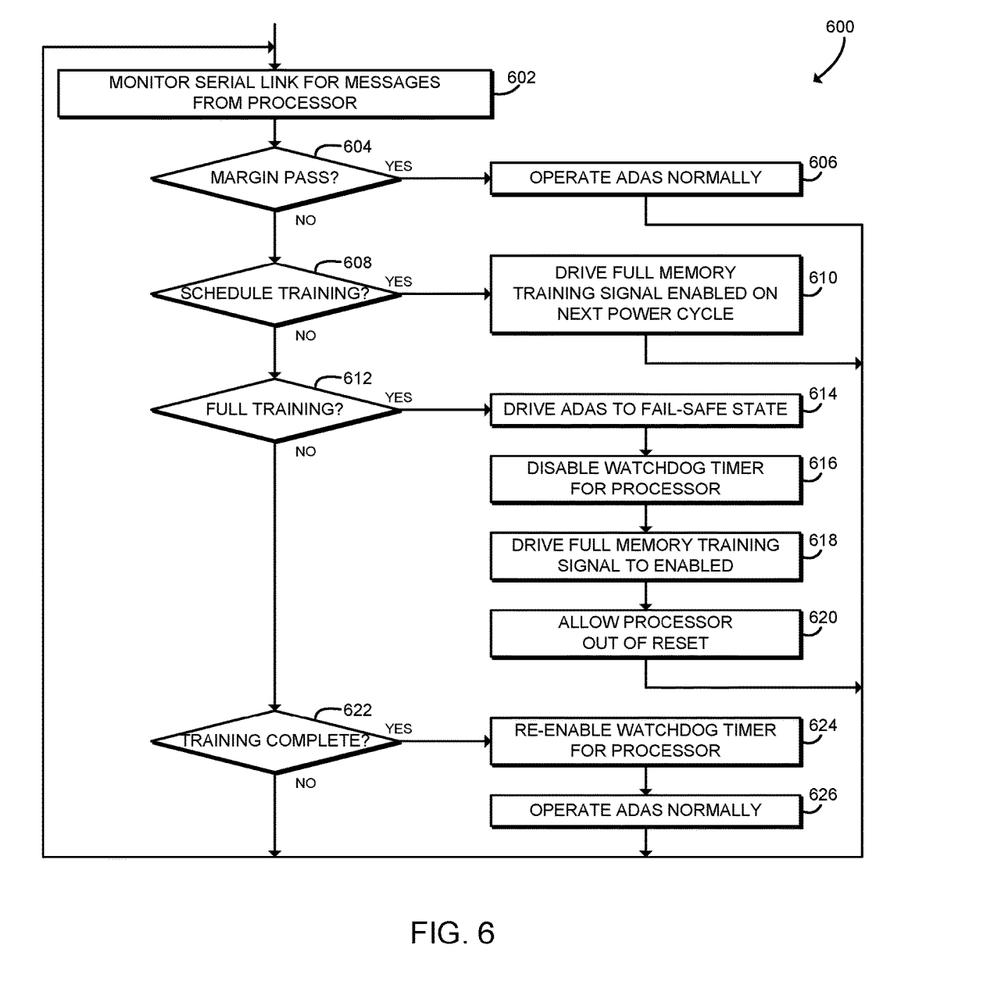
FIG. 6 is a simplified flow diagram of at least one embodiment of a method for memory training management that may be executed by a safety microcontroller of the system of FIGS. 1-2.

Referring now to FIG. 6, in use, the safety microcontroller 104 may execute a method 600 for memory training management. It should be appreciated that, in some embodiments, the method 600 may be embodied as various instructions stored on a computer-readable media, which may be executed by the safety microcontroller 104 to cause the safety microcontroller 104 to perform the method 600. The computer-readable media may be embodied as any type of media capable of being read by the safety microcontroller 104 including, but not limited to, a memory, a data storage device, firmware devices, and/or other media. Additionally or alternatively, it should be appreciated that, in some embodiments, the operations of the method 600 may be performed by one or more components of the environment 220 of the safety microcontroller 104 as shown in FIG. 2.

The method 600 begins in block 602, in which the safety microcontroller 104 monitors the serial link with the ADAS computing device 102 for messages. The safety microcontroller 104 may use any appropriate message format or communication protocol to receive messages from the ADAS computing device 102. In response to receiving a message, the method 600 advances to block 604 to process the received message.

In block 604, the safety microcontroller 104 determines whether a message indicating margin testing passed was received. If not, the method 600 advances to block 608, described below. If a message indicating margin testing passed was received, the method 600 branches to block 606, in which the safety microcontroller 104 allows the ADAS 100 to operate normally. As described above, the ADAS computing device 102 may continue the boot process, load an operating system and applications, and perform advanced driver aid functions. After allowing the ADAS 100 to operate normally, the method 600 loops back to block 602 to continue monitoring for serial messages from the ADAS computing device 102.

Referring back to block 604, if a message indicating margin testing passed was not received, the method 600 advances to block 608, in which the safety microcontroller 104 determines whether a message requesting scheduled training was received. If not, the method 600 advances to block 612, described below. If a message requesting scheduled training was received, the method 600 branches to block 610, in which the safety microcontroller 104 drives the full memory training signal to enabled on the next power cycle of the ADAS computing device 102. For example, the safety microcontroller 104 may drive an appropriate GPIO pin high or low, depending on the particular values expected by the ADAS computing device 102. As described above in connection with FIGS. 3-5, in response to a power cycle, the ADAS computing device 102 checks whether the full memory training signal is raised and, if so, performs full memory training. Note that the safety microcontroller 104 may wait until the next power cycle (e.g., the next time the driver keys on the vehicle) rather than forcing the ADAS computing device 102 into reset immediately. Of course, in some embodiments the safety microcontroller 104 may force an immediate full memory training, similar to the process described below in connection with blocks 614 to 620. After scheduling a full memory training, the method 600 loops back to block 602 to continue monitoring for serial messages from the ADAS computing device 102.

Referring back to block 608, if a message requesting scheduled training was not received, the method 600 advances to block 612, in which the safety microcontroller 104 determines whether a message requesting full training was received. If not, the method 600 advances to block 622, described below. If a message requesting full training was received, the method 600 branches to block 614, in which the safety microcontroller 104 drives the ADAS 100 to the fail-safe state. In the fail-safe state, the safety microcontroller 104 drive the ADAS computing device 102 into reset, for example by asserting a reset line or by powering down the ADAS computing device 102. The safety microcontroller 104 may also ensure that the ADAS 100 continues to perform safety-related operations or other critical operations while in the fail-safe state. For example, while in the fail-safe state the safety microcontroller 104 may operate the ADAS 100 in a degraded operation mode. In some embodiments, the degraded operation mode may provide an indication to the driver that ADAS features are not available and require full manual control of the vehicle. Additionally or alternatively, in some embodiments the degraded operation mode may provide degraded ADAS operations using hardware resources other than the ADAS computing device 102.

In block 616, the safety microcontroller 104 disables a watchdog timer for the processor 120. The watchdog timer may be included in the I/O subsystem 122 and/or external to the ADAS computing device 102. Disabling the watchdog timer may allow the ADAS computing device 102 enough time to perform a potentially lengthy full memory training process. For example, in some embodiments the safety microcontroller 104 may disable the watchdog timer for at least 20 seconds. The particular time limit used may depend on the particular system architecture and/or memory implementation of the ADAS computing device 102.

In block 618, the safety microcontroller 104 drives the full memory training signal to enabled. For example, the safety microcontroller 104 may drive an appropriate GPIO pin high or low, depending on the particular values expected by the ADAS computing device 102. In block 620, the safety microcontroller 104 allows the processor 120 to come out of reset, for example by de-asserting a reset line or powering on the ADAS computing device 102. As described above in connection with FIGS. 3-5, in response to a power cycle, the ADAS computing device 102 checks whether the full memory training signal is raised and, if because the full memory training signal has been raised, performs full memory training. After allowing the processor 120 out of reset, the method 600 loops back to block 602 to continue monitoring for serial messages from the ADAS computing device 102.

Referring back to block 612, if a message requesting full training was not received, the method 600 advances to block 622, in which the safety microcontroller 104 determines whether a message indicating training is complete was received. If not, the method 600 loops back to block 602 to continue monitoring for serial messages from the ADAS computing device 102. If a message indicating training is complete was received, the method 600 advances to block 624, in which the safety microcontroller 104 re-enables the watchdog timer for the processor 120. In block 626, the safety microcontroller 104 allows the ADAS 100 to operate normally. As described above, the ADAS computing device 102 may continue the boot process, load an operating system and applications, and perform advanced driver aid functions. After allowing the ADAS 100 to operate normally, the method 600 loops back to block 602 to continue monitoring for serial messages from the ADAS computing device 102.

EXAMPLES

Illustrative examples of the technologies disclosed herein are provided below. An embodiment of the technologies may include any one or more, and any combination of, the examples described below.

Example 1 includes a computing device for memory parameter pre-training, the computing device comprising: a processor, a memory controller, and a non-volatile storage device; and a boot loader to (i) determine whether a pre-trained memory parameter data set is inconsistent in response to a reset of the processor, wherein the pre-trained memory parameter data is stored by the non-volatile storage device, (ii) send a message that requests full memory training to a safety microcontroller via a serial link in response to a determination that the pre-trained memory parameter data set is inconsistent, (iii) determine whether a full memory training signal is raised via a general-purpose I/O link with the safety microcontroller in response to a determination that the pre-trained memory parameter data set is consistent, (iv) execute a fast boot path to initialize the memory controller with the pre-trained memory parameter data set in response to a determination that the full memory training signal is not raised, and (v) execute a slow boot path to generate the pre-trained memory parameter data set in response to a determination that the full memory training signal is raised.

Example 2 includes the subject matter of Example 1, and wherein to execute the fast boot path comprises to: initialize the memory controller of the computing device with the pre-trained memory parameter data set; and perform a memory parameter margin test in response to initialization of the memory controller.

Example 3 includes the subject matter of any of Examples 1 and 2, and wherein to execute the fast boot path further comprises to: determine whether the memory parameter margin test passed; and send a notification that indicates the memory parameter margin test passed to the safety microcontroller via the serial link in response to a determination that the memory parameter margin test passed.

Example 4 includes the subject matter of any of Examples 1-3, and wherein to execute the fast boot path further comprises to: determine whether the margin parameter test failed at a warning level; and send a notification that indicates the memory parameter margin failed at the warning level to the safety microcontroller via the serial link in response to a determination that the memory parameter margin test failed at the warning level.

Example 5 includes the subject matter of any of Examples 1-4, and wherein the boot loader is further to send a kernel command that indicates the margin test failed at the warning level to an operating system of the computing device in response to the determination that the memory parameter margin test failed at the warning level.

Example 6 includes the subject matter of any of Examples 1-5, and wherein to execute the fast boot path further comprises to: determine whether the margin parameter test failed at a critical level; and send a message that requests the full memory training to the safety microcontroller via the serial link in response to a determination that the memory parameter margin test failed at the critical level.

Example 7 includes the subject matter of any of Examples 1-6, and wherein to execute the slow boot path comprises to: reconfigure a watchdog timer of the computing device to allow the full memory training; perform the full memory training to generate the pre-trained memory parameter data set in response to reconfiguration of the watchdog timer; store the pre-trained memory parameter data set in the non-volatile storage device in response to performance of the full memory training; and send a message that indicates the full memory training is complete to the safety microcontroller via the serial link in response to storage of the pre-trained memory parameter data set.

Example 8 includes the subject matter of any of Examples 1-7, and wherein to reconfigure the watchdog timer comprises to extend the watchdog timer to at least 20 seconds.

Example 9 includes the subject matter of any of Examples 1-8, and wherein: the boot loader is further to boot an operating system of the computing device in response to execution of the fast boot path or execution of the slow boot path; and the computing device further comprises a policy agent to (i) determine whether a full memory training is required based on a training policy of the computing device in response to booting of the operating system, and (ii) send, by the operating system, a message that requests a scheduled full memory training to the safety microcontroller via the serial link in response to a determination that the full memory training is required.

Example 10 includes the subject matter of any of Examples 1-9, and wherein to determine whether the full memory training is required based on the training policy comprises to determine an elapsed time since a last full memory training and comparing the elapsed time to a predetermined maximum time.

Example 11 includes the subject matter of any of Examples 1-10, and wherein to determine whether the full memory training is required based on the training policy comprises to determine whether a margin parameter test failed at a warning level.

Example 12 includes the subject matter of any of Examples 1-11, and wherein the computing device comprises an electronic control unit of a vehicle.

Example 13 includes the subject matter of any of Examples 1-12, and further comprising an advanced driver assist application to receive sensor data from one or mores sensors of a vehicle and to perform a driver assist function based on the sensor data.

Example 14 includes the subject matter of any of Examples 1-13, and wherein to perform the driver assist function comprises to detect a nearby object based on the sensor data and provide a collision warning in response to detection of the nearby object.

Example 15 includes the subject matter of any of Examples 1-14, and wherein to perform the driver assist function comprises to perform a lane departure warning function, a pedestrian detection function, an adaptive cruise control function, or an autonomous driving function.

Example 16 includes the subject matter of any of Examples 1-15, and wherein the safety microcontroller comprises a baseboard management controller of the computing device.

Example 17 includes a system for memory parameter pre-training, the system comprising a computing device and a safety microcontroller, wherein: the safety microcontroller is communicatively coupled to the computing device by a serial link and a general-purpose I/O link; the computing device comprises: a processor, a memory controller, and a non-volatile storage device; and a boot loader to (i) determine whether a full memory training signal is raised via the general-purpose I/O link with the safety microcontroller in response to a reset of the processor, (ii) execute a fast boot path to initialize the memory controller with a pre-trained memory parameter data set stored by the non-volatile storage device in response to a determination that the full memory training signal is not raised, and (iii) execute a slow boot path to generate the pre-trained memory parameter data set in response to a determination that the full memory training signal is raised; and the safety microcontroller comprises: a communication manager to receive a message that requests full memory training from the processor via the serial link; and a memory training manager to (i) hold the processor in reset in response to receipt of the message that requests full memory training, (ii) disable a watchdog timer for the processor in response to holding of the processor in reset, (iii) raise the full memory training signal via the general-purpose I/O link with the processor in response to the holding of the processor in reset, and (iv) reset the processor in response to raising of the full memory training signal.

Example 18 includes the subject matter of Example 17, and wherein: the communication manager is further to receive a message that indicates the full memory training is complete from the processor via the serial link; and the memory training manager is further to enable the watchdog timer for the processor in response to receipt of the message that indicates the full memory training is complete.

Example 19 includes the subject matter of any of Examples 17 and 18, and wherein the computing device further comprises a consistency checker to (i) determine whether the pre-trained memory parameter data set is inconsistent in response to the reset of the processor, and (ii) send the message that requests full memory training to the safety microcontroller via the serial link in response to a determination that the pre-trained memory parameter data set is inconsistent.

Example 20 includes the subject matter of any of Examples 17-19, and wherein to execute the fast boot path comprises to: initialize the memory controller of the computing device with the pre-trained memory parameter data set; and perform a memory parameter margin test in response to initialization of the memory controller.

Example 21 includes the subject matter of any of Examples 17-20, and wherein to execute the fast boot path further comprises to: determine whether the memory parameter margin test passed; and send a notification that indicates the memory parameter margin test passed to the safety microcontroller via the serial link in response to a determination that the memory parameter margin test passed.

Example 22 includes the subject matter of any of Examples 17-21, and wherein to execute the fast boot path further comprises to: determine whether the margin parameter test failed at a warning level; and send a notification that indicates the memory parameter margin failed at the warning level to the safety microcontroller via the serial link in response to a determination that the memory parameter margin test failed at the warning level.

Example 23 includes the subject matter of any of Examples 17-22, and wherein the boot loader is further to send a kernel command that indicates the margin test failed at the warning level to an operating system of the computing device in response to the determination that the memory parameter margin test failed at the warning level.

Example 24 includes the subject matter of any of Examples 17-23, and wherein to execute the fast boot path further comprises to: determine whether the margin parameter test failed at a critical level; and send the message that requests the full memory training to the safety microcontroller via the serial link in response to a determination that the memory parameter margin test failed at the critical level.

Example 25 includes the subject matter of any of Examples 17-24, and wherein to execute the slow boot path comprises to: reconfigure a watchdog timer of the computing device to allow the full memory training; perform the full memory training to generate the pre-trained memory parameter data set in response to reconfiguration of the watchdog timer; store the pre-trained memory parameter data set in the non-volatile storage device in response to performance of the full memory training; and send a message that indicates the full memory training is complete to the safety microcontroller via the serial link in response to storage of the pre-trained memory parameter data set.

Example 26 includes the subject matter of any of Examples 17-25, and wherein to reconfigure the watchdog timer comprises to extend the watchdog timer to at least 20 seconds.

Example 27 includes the subject matter of any of Examples 17-26, and wherein: the boot loader is further to boot an operating system of the computing device in response to execution of the fast boot path or execution of the slow boot path; and the computing device further comprises a policy agent to (i) determine whether a full memory training is required based on a training policy of the computing device in response to booting of the operating system, and (ii) send, by the operating system, a message that requests a scheduled full memory training to the safety microcontroller via the serial link in response to a determination that the full memory training is required.

Example 28 includes the subject matter of any of Examples 17-27, and wherein: the communication manager is further to receive the message that requests the scheduled full memory training from the processor via the serial link; and the memory training manager is further to raise the full memory training signal via the general-purpose I/O link with the processor in response to a reboot of the processor and in response to receipt of the message that requests the scheduled full memory training from the processor via the serial link.

Example 29 includes the subject matter of any of Examples 17-28, and wherein to determine whether the full memory training is required based on the training policy comprises to determine an elapsed time since a last full memory training and comparing the elapsed time to a predetermined maximum time.

Example 30 includes the subject matter of any of Examples 17-29, and wherein to determine whether the full memory training is required based on the training policy comprises to determine whether a margin parameter test failed at a warning level.

Example 31 includes the subject matter of any of Examples 17-30, and wherein the computing device and the safety microcontroller are included in a vehicle.

Example 32 includes the subject matter of any of Examples 17-31, and further comprising one or more sensors of a vehicle, wherein the sensors are communicatively coupled to the safety microcontroller, and wherein the computing device further comprises an advanced driver assist application to receive sensor data from the sensors and perform a driver assist function based on the sensor data.

Example 33 includes the subject matter of any of Examples 17-32, and wherein to perform the driver assist function comprises to detect a nearby object based on the sensor data and provide a collision warning in response to detection of the nearby object.

Example 34 includes the subject matter of any of Examples 17-33, and wherein to perform the driver assist function comprises to perform a lane departure warning function, a pedestrian detection function, an adaptive cruise control function, or an autonomous driving function.

Example 35 includes the subject matter of any of Examples 17-34, and wherein the safety microcontroller comprises a baseboard management controller of the computing device.

Example 36 includes a method for memory parameter pre-training, the method comprising: bringing, by a computing device, a processor of the computing device out of reset; determining, by the computing device, whether a pre-trained memory parameter data set is inconsistent in response to bringing the processor out of reset, wherein the pre-trained memory parameter data is stored by a non-volatile storage device of the computing device; sending, by the computing device, a message that requests full memory training to a safety microcontroller via a serial link in response to determining that the pre-trained memory parameter data set is inconsistent; determining, by the computing device, whether a full memory training signal is raised via a general-purpose I/O link with the safety microcontroller in response to determining that the pre-trained memory parameter data set is consistent; executing, by the computing device, a fast boot path to initialize a memory controller of the computing device using the pre-trained memory parameter data set in response to determining that the full memory training signal is not raised; and executing, by the computing device, a slow boot path to generate the pre-trained memory parameter data set in response to determining that the full memory training signal is raised.

Example 37 includes the subject matter of Example 36, and wherein executing the fast boot path comprises: initializing the memory controller of the computing device using the pre-trained memory parameter data set; and performing a memory parameter margin test in response to initializing the memory controller.

Example 38 includes the subject matter of any of Examples 36 and 37, and wherein executing the fast boot path further comprises: determining whether the memory parameter margin test passed; and sending a notification that indicates the memory parameter margin test passed to the safety microcontroller via the serial link in response to determining that the memory parameter margin test passed.

Example 39 includes the subject matter of any of Examples 36-38, and wherein executing the fast boot path further comprises: determining whether the margin parameter test failed at a warning level; and sending a notification that indicates the memory parameter margin failed at the warning level to the safety microcontroller via the serial link in response to determining that the memory parameter margin test failed at the warning level.

Example 40 includes the subject matter of any of Examples 36-39, and further comprising sending, by the computing device, a kernel command that indicates the margin test failed at the warning level to an operating system of the computing device in response to determining that the memory parameter margin test failed at the warning level.

Example 41 includes the subject matter of any of Examples 36-40, and wherein executing the fast boot path further comprises: determining whether the margin parameter test failed at a critical level; and sending a message that requests the full memory training to the safety microcontroller via the serial link in response to determining that the memory parameter margin test failed at the critical level.

Example 42 includes the subject matter of any of Examples 36-41, and wherein executing the slow boot path comprises: reconfiguring a watchdog timer of the computing device to allow the full memory training; performing the full memory training to generate the pre-trained memory parameter data set in response to reconfiguring the watchdog timer; storing the pre-trained memory parameter data set in the non-volatile storage device in response to performing the full memory training; and sending a message that indicates the full memory training is complete to the safety microcontroller via the serial link in response to storing the pre-trained memory parameter data set.

Example 43 includes the subject matter of any of Examples 36-42, and wherein reconfiguring the watchdog timer comprises extending the watchdog timer to at least 20 seconds.

Example 44 includes the subject matter of any of Examples 36-43, and further comprising: booting, by the computing device, an operating system of the computing device in response to executing the fast boot path or executing the slow boot path; determining whether a full memory training is required based on a training policy of the computing device in response to booting the operating system; and sending, by the operating system, a message that requests a scheduled full memory training to the safety microcontroller via the serial link in response to determining that the full memory training is required.

Example 45 includes the subject matter of any of Examples 36-44, and wherein determining whether the full memory training is required based on the training policy comprises determining an elapsed time since a last full memory training and comparing the elapsed time to a predetermined maximum time.

Example 46 includes the subject matter of any of Examples 36-45, and wherein determining whether the full memory training is required based on the training policy comprises determining whether a margin parameter test failed at a warning level.

Example 47 includes the subject matter of any of Examples 36-46, and wherein the computing device comprises an electronic control unit of a vehicle.

Example 48 includes the subject matter of any of Examples 36-47, and further comprising: receiving, by the computing device, sensor data from one or mores sensors of a vehicle; and performing, by the computing device, a driver assist function based on the sensor data.

Example 49 includes the subject matter of any of Examples 36-48, and wherein performing the driver assist function comprises detecting a nearby object based on the sensor data and providing a collision warning in response to detecting the nearby object.

Example 50 includes the subject matter of any of Examples 36-49, and wherein performing the driver assist function comprises performing a lane departure warning function, a pedestrian detection function, an adaptive cruise control function, or an autonomous driving function.

Example 51 includes the subject matter of any of Examples 36-50, and wherein the safety microcontroller comprises a baseboard management controller of the computing device.

Example 52 includes the subject matter of any of Examples 36-51 and further comprising: receiving, by the safety microcontroller, a message that requests full memory training from the processor via the serial link; holding, by the safety microcontroller, the processor in reset in response to receiving the message that requests full memory training; disabling, by the safety microcontroller, a watchdog timer for the processor in response to holding the processor in reset; and raising, by the safety microcontroller, the full memory training signal via the general-purpose I/O link with the processor in response to holding the processor in reset; wherein bringing the processor out of reset comprises bringing, by the safety microcontroller, the processor out of reset in response to raising the full memory training signal.

Example 53 includes the subject matter of any of Examples 36-52, and further comprising: receiving, by the safety microcontroller, a message that indicates the full memory training is complete from the processor via the serial link; and enabling, by the safety microcontroller, the watchdog timer for the processor in response to receiving the message that indicates the full memory training is complete.

Example 54 includes the subject matter of any of Examples 36-53, and further comprising: receiving, by the safety microcontroller, a message that requests a scheduled full memory training from the processor via the serial link; and raising, by the safety microcontroller, the full memory training signal via the general-purpose I/O link with the processor in response to a reboot of the processor and in response to receiving the message that requests the scheduled full memory training from the processor via the serial link.

Example 55 includes a method for memory parameter pre-training, the method comprising: determining, by a computing device, whether a full memory training signal is raised via a general-purpose I/O link with a safety microcontroller in response to a reset of a processor of the computing device; executing, by the computing device, a fast boot path to initialize a memory controller of the computing device with a pre-trained memory parameter data set stored by a non-volatile storage device of the computing device in response to determining that the full memory training signal is not raised; executing, by the computing device, a slow boot path to generate the pre-trained memory parameter data set in response to determining that the full memory training signal is raised; receiving, by the safety microcontroller, a message that requests full memory training from the processor of the computing device via a serial link with the computing device; holding, by the safety microcontroller, the processor of the computing device in reset in response to receiving the message that requests full memory training; disabling, by the safety microcontroller, a watchdog timer for the processor in response to holding the processor in reset; raising, by the safety microcontroller, the full memory training signal via the general-purpose I/O link with the computing device in response to holding the processor in reset; and resetting, by the safety microcontroller, the processor in response to raising the full memory training signal.

Example 56 includes the subject matter of Example 55, and further comprising: receiving, by the safety microcontroller, a message that indicates the full memory training is complete from the processor via the serial link; and enabling, by the safety microcontroller, the watchdog timer for the processor in response to receiving the message that indicates the full memory training is complete.

Example 57 includes the subject matter of any of Examples 55 and 56, and further comprising: booting, by the computing device, an operating system of the computing device in response executing the fast boot path or executing the slow boot path; determining, by the computing device, whether a full memory training is required based on a training policy of the computing device in response to booting the operating system; and sending, by the operating system of the computing device, a message that requests a scheduled full memory training to the safety microcontroller via the serial link in response to determining that the full memory training is required.

Example 58 includes the subject matter of any of Examples 55-57, and further comprising: receiving, by the safety microcontroller, the message that requests the scheduled full memory training from the processor via the serial link; and raising the full memory training signal via the general-purpose I/O link with the processor in response to a reboot of the processor and in response to receiving the message that requests the scheduled full memory training from the processor via the serial link.

Example 59 includes a computing device comprising: a processor; and a memory having stored therein a plurality of instructions that when executed by the processor cause the computing device to perform the method of any of Examples 36-58.

Example 60 includes one or more machine readable storage media comprising a plurality of instructions stored thereon that in response to being executed result in a computing device performing the method of any of Examples 36-58.

Example 61 includes a computing device comprising means for performing the method of any of Examples 36-58.

Example 62 includes a computing device for memory parameter pre-training, the computing device comprising: means for bringing a processor of the computing device out of reset; means for determining whether a pre-trained memory parameter data set is inconsistent in response to bringing the processor out of reset, wherein the pre-trained memory parameter data is stored by a non-volatile storage device of the computing device; means for sending a message that requests full memory training to a safety microcontroller via a serial link in response to determining that the pre-trained memory parameter data set is inconsistent; means for determining whether a full memory training signal is raised via a general-purpose I/O link with the safety microcontroller in response to determining that the pre-trained memory parameter data set is consistent; means for executing a fast boot path to initialize a memory controller of the computing device using the pre-trained memory parameter data set in response to determining that the full memory training signal is not raised; and means for executing a slow boot path to generate the pre-trained memory parameter data set in response to determining that the full memory training signal is raised.

Example 63 includes the subject matter of Example 62, and wherein the means for executing the fast boot path comprises: means for initializing the memory controller of the computing device using the pre-trained memory parameter data set; and means for performing a memory parameter margin test in response to initializing the memory controller.

Example 64 includes the subject matter of any of Examples 62 and 63, and wherein the means for executing the fast boot path further comprises: means for determining whether the memory parameter margin test passed; and means for sending a notification that indicates the memory parameter margin test passed to the safety microcontroller via the serial link in response to determining that the memory parameter margin test passed.

Example 65 includes the subject matter of any of Examples 62-64, and wherein the means for executing the fast boot path further comprises: means for determining whether the margin parameter test failed at a warning level; and means for sending a notification that indicates the memory parameter margin failed at the warning level to the safety microcontroller via the serial link in response to determining that the memory parameter margin test failed at the warning level.

Example 66 includes the subject matter of any of Examples 62-65, and further comprising means for sending a kernel command that indicates the margin test failed at the warning level to an operating system of the computing device in response to determining that the memory parameter margin test failed at the warning level.

Example 67 includes the subject matter of any of Examples 62-66, and wherein the means for executing the fast boot path further comprises: means for determining whether the margin parameter test failed at a critical level; and means for sending a message that requests the full memory training to the safety microcontroller via the serial link in response to determining that the memory parameter margin test failed at the critical level.

Example 68 includes the subject matter of any of Examples 62-67, and wherein the means for executing the slow boot path comprises: means for reconfiguring a watchdog timer of the computing device to allow the full memory training; means for performing the full memory training to generate the pre-trained memory parameter data set in response to reconfiguring the watchdog timer; means for storing the pre-trained memory parameter data set in the non-volatile storage device in response to performing the full memory training; and means for sending a message that indicates the full memory training is complete to the safety microcontroller via the serial link in response to storing the pre-trained memory parameter data set.

Example 69 includes the subject matter of any of Examples 62-68, and wherein the means for reconfiguring the watchdog timer comprises means for extending the watchdog timer to at least 20 seconds.

Example 70 includes the subject matter of any of Examples 62-69, and further comprising: means for booting an operating system of the computing device in response to executing the fast boot path or executing the slow boot path; means for determining whether a full memory training is required based on a training policy of the computing device in response to booting the operating system; and means for sending, by the operating system, a message that requests a scheduled full memory training to the safety microcontroller via the serial link in response to determining that the full memory training is required.

Example 71 includes the subject matter of any of Examples 62-70, and wherein the means for determining whether the full memory training is required based on the training policy comprises means for determining an elapsed time since a last full memory training and comparing the elapsed time to a predetermined maximum time.

Example 72 includes the subject matter of any of Examples 62-71, and wherein the means for determining whether the full memory training is required based on the training policy comprises means for determining whether a margin parameter test failed at a warning level.

Example 73 includes the subject matter of any of Examples 62-72, and wherein the computing device comprises an electronic control unit of a vehicle.

Example 74 includes the subject matter of any of Examples 62-73, and further comprising: means for receiving sensor data from one or mores sensors of a vehicle; and means for performing a driver assist function based on the sensor data.

Example 75 includes the subject matter of any of Examples 62-74, and wherein the means for performing the driver assist function comprises means for detecting a nearby object based on the sensor data and providing a collision warning in response to detecting the nearby object.

Example 76 includes the subject matter of any of Examples 62-75, and wherein the means for performing the driver assist function comprises means for performing a lane departure warning function, a pedestrian detection function, an adaptive cruise control function, or an autonomous driving function.

Example 77 includes the subject matter of any of Examples 62-76, and wherein the safety microcontroller comprises a baseboard management controller of the computing device.

The invention claimed is:

1. A computing device for memory parameter pre-training, the computing device comprising:
 a processor, a memory controller, and a non-volatile storage device; and
 a boot loader to (i) determine whether a pre-trained memory parameter data set is inconsistent in response to a reset of the processor, wherein the pre-trained memory parameter data is stored by the non-volatile storage device, (ii) send a message that requests full memory training to a safety microcontroller via a serial link in response to a determination that the pre-trained memory parameter data set is inconsistent, (iii) determine whether a full memory training signal is raised via a general-purpose I/O link with the safety microcontroller in response to a determination that the pre-trained memory parameter data set is consistent, (iv) execute a fast boot path to initialize the memory controller with the pre-trained memory parameter data set in response to a determination that the full memory training signal is not raised, and (v) execute a slow boot path to generate the pre-trained memory parameter data set in response to a determination that the full memory training signal is raised.

2. The computing device of claim 1, wherein to execute the fast boot path comprises to:
 initialize the memory controller of the computing device with the pre-trained memory parameter data set; and
 perform a memory parameter margin test in response to initialization of the memory controller.

3. The computing device of claim 2, wherein to execute the fast boot path further comprises to:
 determine whether the memory parameter margin test passed; and
 send a notification that indicates the memory parameter margin test passed to the safety microcontroller via the serial link in response to a determination that the memory parameter margin test passed.

4. The computing device of claim 2, wherein to execute the fast boot path further comprises to:
 determine whether the margin parameter test failed at a warning level; and
 send a notification that indicates the memory parameter margin failed at the warning level to the safety microcontroller via the serial link in response to a determination that the memory parameter margin test failed at the warning level.

5. The computing device of claim 4, wherein the boot loader is further to send a kernel command that indicates the margin test failed at the warning level to an operating system of the computing device in response to the determination that the memory parameter margin test failed at the warning level.

6. The computing device of claim 2, wherein to execute the fast boot path further comprises to:
determine whether the margin parameter test failed at a critical level; and
send a message that requests the full memory training to the safety microcontroller via the serial link in response to a determination that the memory parameter margin test failed at the critical level.

7. The computing device of claim 1, wherein to execute the slow boot path comprises to:
reconfigure a watchdog timer of the computing device to allow the full memory training;
perform the full memory training to generate the pre-trained memory parameter data set in response to reconfiguration of the watchdog timer;
store the pre-trained memory parameter data set in the non-volatile storage device in response to performance of the full memory training; and
send a message that indicates the full memory training is complete to the safety microcontroller via the serial link in response to storage of the pre-trained memory parameter data set.

8. The computing device of claim 7, wherein to reconfigure the watchdog timer comprises to extend the watchdog timer to at least 20 seconds.

9. The computing device of claim 1, wherein:
the boot loader is further to boot an operating system of the computing device in response to execution of the fast boot path or execution of the slow boot path; and
the computing device further comprises a policy agent to (i) determine whether a full memory training is required based on a training policy of the computing device in response to booting of the operating system, and (ii) send, by the operating system, a message that requests a scheduled full memory training to the safety microcontroller via the serial link in response to a determination that the full memory training is required.

10. The computing device of claim 9, wherein to determine whether the full memory training is required based on the training policy comprises to determine an elapsed time since a last full memory training and comparing the elapsed time to a predetermined maximum time.

11. The computing device of claim 9, wherein to determine whether the full memory training is required based on the training policy comprises to determine whether a margin parameter test failed at a warning level.

12. A method for memory parameter pre-training, the method comprising:
bringing, by a computing device, a processor of the computing device out of reset;
determining, by the computing device, whether a pre-trained memory parameter data set is inconsistent in response to bringing the processor out of reset, wherein the pre-trained memory parameter data is stored by a non-volatile storage device of the computing device;
sending, by the computing device, a message that requests full memory training to a safety microcontroller via a serial link in response to determining that the pre-trained memory parameter data set is inconsistent;
determining, by the computing device, whether a full memory training signal is raised via a general-purpose I/O link with the safety microcontroller in response to determining that the pre-trained memory parameter data set is consistent;
executing, by the computing device, a fast boot path to initialize a memory controller of the computing device using the pre-trained memory parameter data set in response to determining that the full memory training signal is not raised; and
executing, by the computing device, a slow boot path to generate the pre-trained memory parameter data set in response to determining that the full memory training signal is raised.

13. The method of claim 12, wherein executing the fast boot path comprises:
initializing the memory controller of the computing device using the pre-trained memory parameter data set; and
performing a memory parameter margin test in response to initializing the memory controller.

14. The method of claim 13, wherein executing the fast boot path further comprises:
determining whether the margin parameter test failed at a warning level; and
sending a notification that indicates the memory parameter margin failed at the warning level to the safety microcontroller via the serial link in response to determining that the memory parameter margin test failed at the warning level.

15. The method of claim 13, wherein executing the fast boot path further comprises:
determining whether the margin parameter test failed at a critical level; and
sending a message that requests the full memory training to the safety microcontroller via the serial link in response to determining that the memory parameter margin test failed at the critical level.

16. The method of claim 12, wherein executing the slow boot path comprises:
reconfiguring a watchdog timer of the computing device to allow the full memory training;
performing the full memory training to generate the pre-trained memory parameter data set in response to reconfiguring the watchdog timer;
storing the pre-trained memory parameter data set in the non-volatile storage device in response to performing the full memory training; and
sending a message that indicates the full memory training is complete to the safety microcontroller via the serial link in response to storing the pre-trained memory parameter data set.

17. The method of claim 12, further comprising:
booting, by the computing device, an operating system of the computing device in response to executing the fast boot path or executing the slow boot path;
determining whether a full memory training is required based on a training policy of the computing device in response to booting the operating system; and
sending, by the operating system, a message that requests a scheduled full memory training to the safety microcontroller via the serial link in response to determining that the full memory training is required.

18. One or more non-transitory, computer-readable storage media comprising a plurality of instructions that in response to being executed cause a computing device to:
bring a processor of the computing device out of reset;
determine whether a pre-trained memory parameter data set is inconsistent in response to bringing the processor out of reset, wherein the pre-trained memory parameter data is stored by a non-volatile storage device of the computing device;

send a message that requests full memory training to a safety microcontroller via a serial link in response to determining that the pre-trained memory parameter data set is inconsistent;

determine whether a full memory training signal is raised via a general-purpose I/O link with the safety microcontroller in response to determining that the pre-trained memory parameter data set is consistent;

execute a fast boot path to initialize a memory controller of the computing device using the pre-trained memory parameter data set in response to determining that the full memory training signal is not raised; and execute a slow boot path to generate the pre-trained memory parameter data set in response to determining that the full memory training signal is raised.

19. The one or more non-transitory, computer-readable storage media of claim 18, wherein to execute the fast boot path comprises to:

initialize the memory controller of the computing device using the pre-trained memory parameter data set; and perform a memory parameter margin test in response to initializing the memory controller.

20. The one or more non-transitory, computer-readable storage media of claim 19, wherein to execute the fast boot path further comprises to:

determine whether the margin parameter test failed at a warning level; and send a notification that indicates the memory parameter margin failed at the warning level to the safety microcontroller via the serial link in response to determining that the memory parameter margin test failed at the warning level.

21. The one or more non-transitory, computer-readable storage media of claim 19, wherein to execute the fast boot path further comprises to:

determine whether the margin parameter test failed at a critical level; and send a message that requests the full memory training to the safety microcontroller via the serial link in response to determining that the memory parameter margin test failed at the critical level.

22. The one or more non-transitory, computer-readable storage media of claim 18, wherein to execute the slow boot path comprises to:

reconfigure a watchdog timer of the computing device to allow the full memory training;

perform the full memory training to generate the pre-trained memory parameter data set in response to reconfiguring the watchdog timer;

store the pre-trained memory parameter data set in the non-volatile storage device in response to performing the full memory training; and send a message that indicates the full memory training is complete to the safety microcontroller via the serial link in response to storing the pre-trained memory parameter data set.

23. The one or more non-transitory, computer-readable storage media of claim 18, further comprising a plurality of instructions that in response to being executed cause the computing device to:

boot an operating system of the computing device in response to executing the fast boot path or executing the slow boot path;

determine whether a full memory training is required based on a training policy of the computing device in response to booting the operating system; and send, by the operating system, a message that requests a scheduled full memory training to the safety microcontroller via the serial link in response to determining that the full memory training is required.

24. The one or more non-transitory, computer-readable storage media of claim 18, further comprising a plurality of instructions that in response to being executed cause the safety microcontroller to:

receive a message that requests full memory training from the processor via the serial link;

hold the processor in reset in response to receiving the message that requests full memory training;

disable a watchdog timer for the processor in response to holding the processor in reset; and raise the full memory training signal via the general-purpose I/O link with the processor in response to holding the processor in reset;

wherein to bring the processor out of reset comprises to bring, by the safety microcontroller, the processor out of reset in response to raising the full memory training signal.

25. The one or more non-transitory, computer-readable storage media of claim 18, further comprising a plurality of instructions that in response to being executed cause the safety microcontroller to:

receive a message that requests a scheduled full memory training from the processor via the serial link; and raise the full memory training signal via the general-purpose I/O link with the processor in response to a reboot of the processor and in response to receiving the message that requests the scheduled full memory training from the processor via the serial link.

* * * * *